United States Patent [19]
Belohoubek et al.

[11] 3,808,745
[45] May 7, 1974

[54] MACHINE TOOL FOR HEAVY COUNTER-BALANCED CRANKSHAFTS

[75] Inventors: Bohuslav Belohoubek; Josef Linda, both of Praha, Czechoslovakia

[73] Assignee: Tos Hostivar, Narodni Podnik, Praha-Hostivar, Czechoslovakia

[22] Filed: Jan. 3, 1972

[21] Appl. No.: 214,561

[30] Foreign Application Priority Data
Jan. 4, 1971   Czechoslovakia ...................... 28-71

[52] U.S. Cl. .................................. 51/3, 51/73 GC
[51] Int. Cl..... B24b 25/00, B24b 27/00, B24b 7/00
[58] Field of Search ............ 51/73, 66, 3, 119, 120, 51/48

[56] References Cited
UNITED STATES PATENTS

| | | | |
|---|---|---|---|
| 1,842,009 | 1/1932 | Brasch............................ | 51/73 GC |
| 2,245,435 | 6/1941 | Dowdineau ..................... | 51/73 GC |

FOREIGN PATENTS OR APPLICATIONS

| | | | |
|---|---|---|---|
| 299,382 | 7/1917 | Germany ................................ | 120/ |
| 579,983 | 7/1933 | Germany......................... | 51/73 GC |
| 526,997 | 6/1931 | Germany......................... | 51/73 GC |
| 537,177 | 10/1931 | Germany......................... | 51/73 GC |

Primary Examiner—James L. Jones, Jr.
Attorney, Agent, or Firm—Murray Schaffer

[57] ABSTRACT

A machine tool for heavy counter-balanced crankshafts having a rear bed and front bed with two rotating working headstocks for stationarily supporting a worked counter-balanced crankshaft. The headstocks are located at opposite sides of the rear bed. At least one supporting grinder rest is placed between the working headstocks. The front bed is adjacent to the rear bed and longitudinally movable bed slides are located on both sides. A carrying saddle is placed upon the slides and a guiding circular body is mounted on the carrying saddle. A rotary carrying body is pivotally mounted within the guiding circular body, and is provided with its own drive means for circular movement within said guiding circular body. An adjustable machining means is provided on the carrying body and in the guiding circular body and rotary carrying body are provided with openings positioned on the side to the worked crankshafts. The openings enable, when coincidently set on both the bodies, a working member consisting of guiding circular body and rotary carrying with working tool to be placed on the worked heavy counter-balanced crankshaft.

3 Claims, 5 Drawing Figures

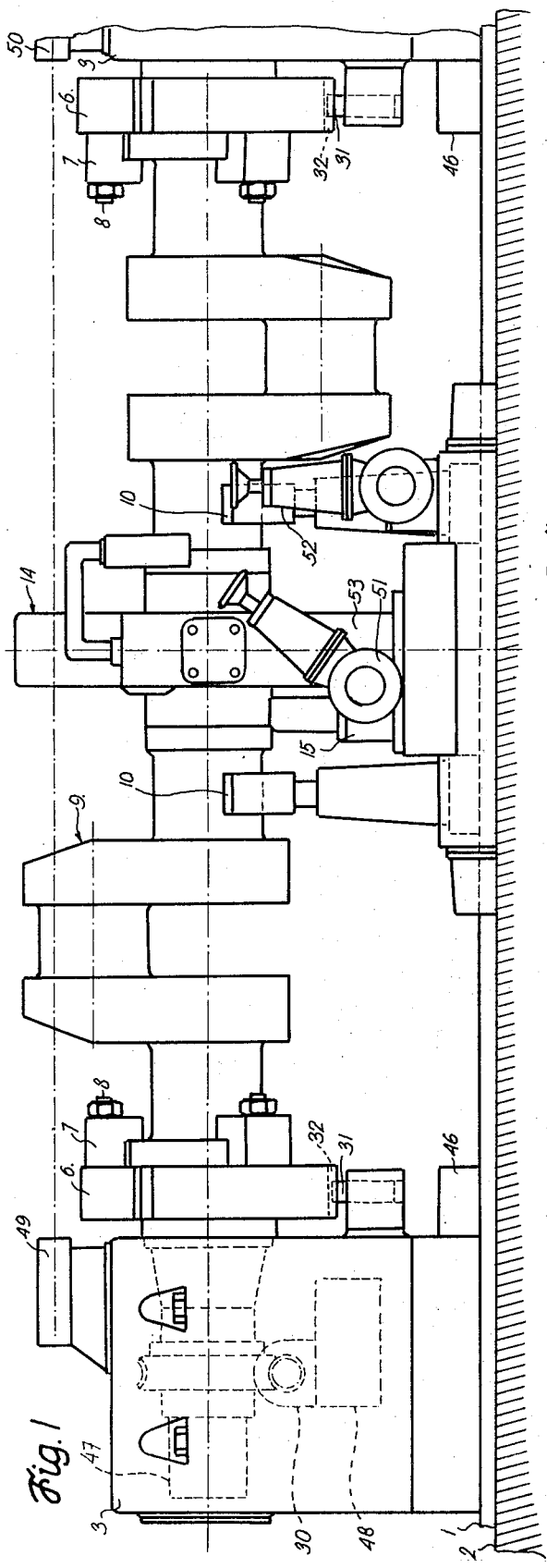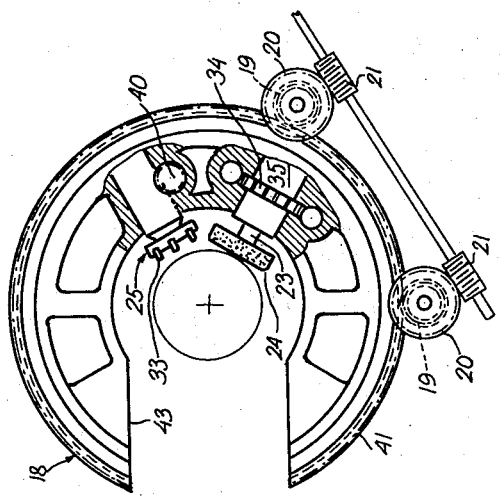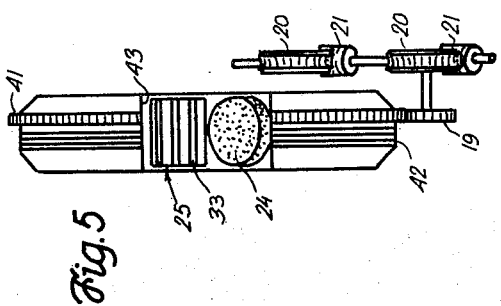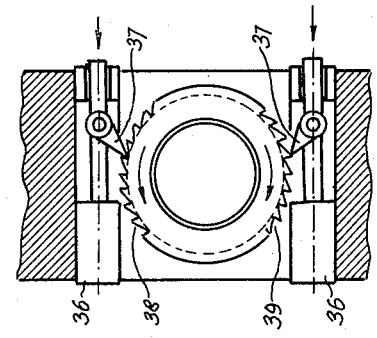

3,808,745

MACHINE TOOL FOR HEAVY COUNTER-BALANCED CRANKSHAFTS

BACKGROUND OF INVENTION

This invention relates to a machine tool for machining heavy counter-balanced crankshafts, especially for the final precise machining of such crankshafts in order to achieve very precise parameters and high quality of their surface.

Heavy counter-balanced crankshafts of the weight of 20 or more tons can be divided into two groups, that is, into semi-assembled counter-balanced crankshafts and fully-assembled counter-balanced crankshafts and fully-assembled counter-balanced crankshafts. The semi-assembled counter-balanced crankshafts are manufactured such that the crankshaft webs and the crankshaft journals are worked in one piece, after which they are pressed together with the central crankpins. With fully-assembled counter-balanced crankshafts the crankshaft webs, crankshaft journals and central crank pins are worked separately and then they are pressed together into one unit. The crank pins are usually forged and then worked on a lathe. The crankshaft webs are worked by milling and drilling. The crankshaft journals are worked on a special milling lathe. After setting the heavy counter-balanced crankshaft together into one unit the final finishing of such crankshaft must be carried out with particular regard to accuracy, that is, alignment, roundness, cylindrical shape of individual journals, mass balance, accuracy of parameters and high quality of the surface. The combined influence of these factors of quality requires that the finishing of heavy counter-balanced crankshafts must be carried out only as hand operation with checking by means of color calibrating. This work is extremely lengthy, requires great effort and a number of skilled workers, which in recent times has not reached accuracy required.

Nowadays, building huge ships and increasing the output and efficiency of ship engines considerably increases the requirements for very precise working of the heaviest counter-balanced crankshafts. Crankshafts having a quenched surface have begun to be used. The accuracy required from manufacturers of those counter-balanced crankshafts has reached such a high level that the hitherto known methods of manufacturing cannot possibly fulfil these requirements.

The aim of the present invention is to obviate the described disadvantages of the known methods and to produce a machine tool for heavy counter-balanced crankshafts.

SUMMARY OF THE INVENTION

According to the present invention a machine tool of the type described is provided comprising a rear bed and front bed with two working headstocks for stationary hanging of worked counter-balanced crankshaft enabling their turning. The working headstock is located at opposite sides of the rear bed, and at least one supporting grinder rest is placed between the working headstocks. A front bed is placed adjacent to the rear bed, and on both sides are located bed slides which are longitudinally movable. A carrying saddle is placed upon the slides, and a guiding circular body is mounted on the carrying saddle having the possibility of radial movement. A rotary carrying body is pivotally mounted within said guiding circular body, which is provided with its own driving means for circular movement within said guiding circular body. Further, the guiding body is provided on its inner part with an adjustable machining means, wherein the guiding circular body and rotary carrying body have openings positioned on the side to the worked crankshaft. The openings enable, when coincidently set on both said bodies, to put a working member consisting of guiding circular body and rotary carrying body with working tool on a worked heavy counter-balanced crankshaft. The rotary carrying body is provided, in order to ensure the circular working movement within the guiding circular body, with driving means, for example, with a gear provided at least with two driving elements located spaced from each other at the distance greater than the width of the openings, in order that at least one of those driving elements is in driving gear with the rotary carrying body. The adjustable machinging means are preferably arranged as a segment carrying a cup grinding wheel and a successive superfinishing segment which are mounted on a wheel-head rigidly mounted within the rotary carrying body and enabling cross-directional movement of said machining means.

According to the invention there is provided a machine tool for heavy counter-balanced crankshafts having several advantages, the most important of which are the abilities of increasing the final accuracy of machining the crankshaft, removing hand work hitherto used with this machining, increasing the quality of worked surface of crankshafts and increasing the roundness of central crank pins and crank-shaft journals with their axes being co-axial and having minimal taper ratio. Another object of the present invention is to provide a machine tool, for heavy counter-balanced crankshaft, of smaller size and weight as a result of the fact that the crankshaft is worked when it is being supported in a stationary position. Still another object of a machine tool according to the invention is substantial decrease in working time for final machining of the heavy counter-balanced crankshaft with a substantial decreasing of a number of needed workers.

To enable the nature of the invention to be more easily understood one embodiment of the invention will now be described by way of example with reference to the accompanying drawings.

BRIEF DESCRIPTION OF DRAWING

In the drawings:

FIG. 1 is an elevation view of a machine tool according to the invention,

FIG. 3 shows a side elevation of a rotary carrying body with driving means, FIG. 4 shows a detailed view by plane A — A from FIG. 3, and FIG. 5 shows a frontal view of a rotary carrying body from the side of opening.

DESCRIPTION OF INVENTION

Figure 2:
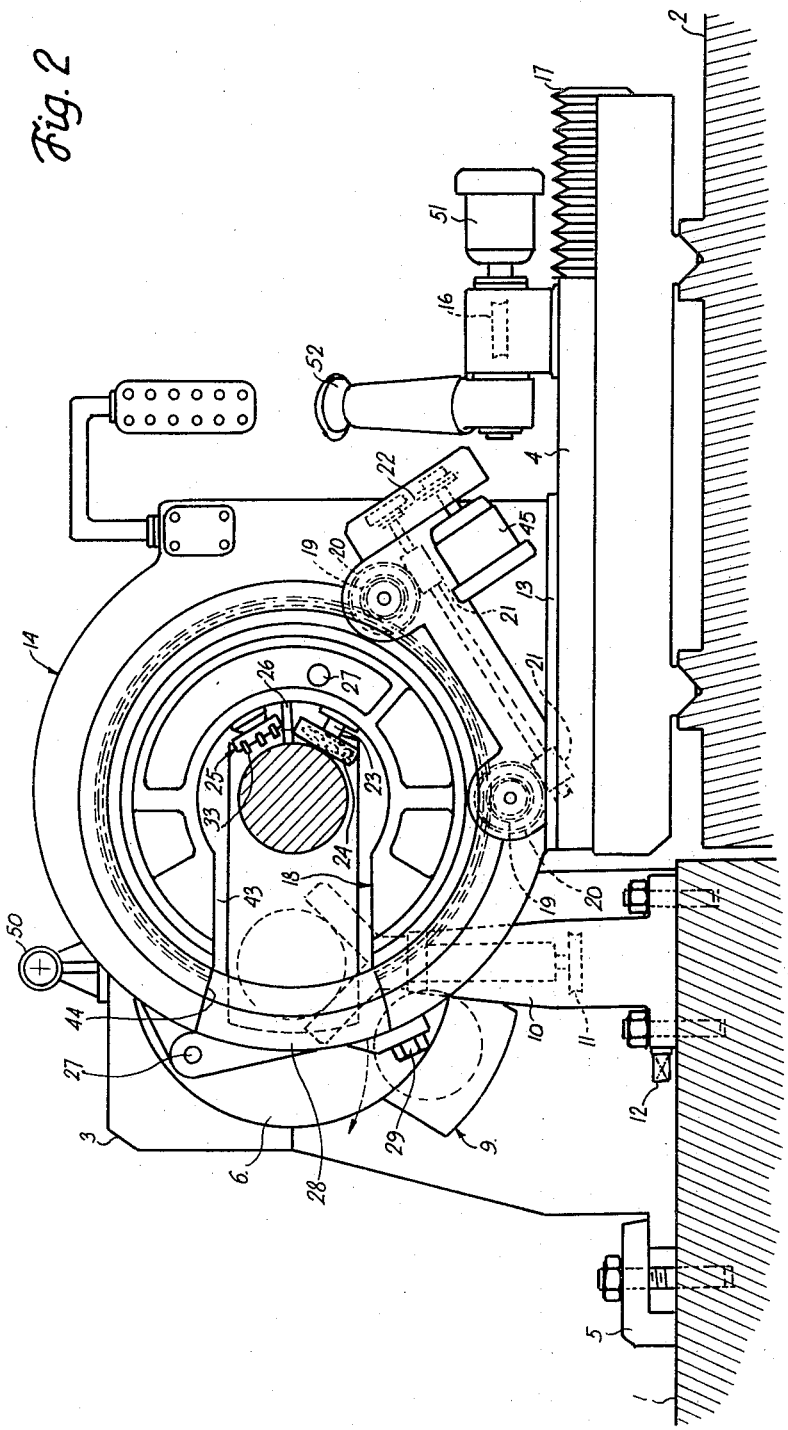
FIG. 2 shows a cut-away side elevation view of a machine tool according to the invention by a plane of grinding the crankshaft journal.

As it is shown in drawings, a machine tool according to the invention is placed on two beds, the rear bed 1 and front bed 2. Working headstocks 3 are adjustably set on the ends of the rear bed 1 so that they may be shifted by electro-motor means and so that they may be secured by means of securing jaws 5, which are adjustable by screws. The working headstocks 3 are provided on their inner part with clamping boards 6, onto which there are fixed, by means of clamping screws 8 and clamping jaws 7 the end parts of the counter-balanced crankshaft 9 to be worked, so that it is supported between those working headstocks 3. The clamping boards 6 are rotatably fixed within the working headstocks 3 on a shaft driven by means of an electric motor and gear box 30, so that they can be simultaneously pivoted into the required position in order to set the supported counter-balanced crankshaft 9 in position to be worked. The securing of this working position is carried out by means of pawls 31. Dividing grooves 32 are formed on the periphery of the clamping boards 6, which serve for reading off the exact position when set. The working headstocks 3 are also provided with, not shown, optic apparatus for following the co-axiality.

One or several supporting rests 10 are positioned on the rear bed 1 between both working headstocks 3. The supporting rests 10 are highly adjustable verticlly by means of set screws 11 and longitudinally adjustable by means of re-setting screws 12. These supporting rests 10 serve to support the worked counter-balanced crankshaft 9 which is stationary carried between the working headstocks 3. The support is aimed at preventing crankshaft deflection.

Parallel to the rear bed 1 there is located the front bed 2 onto which is movably positioned bed slides 13 carrying a guiding circular body 14 and a rotary carrying body 18. The bed slides 13 are longitudinally movable on the front bed 2 by means of electric motor and gear-box 16 of a longitudinal transmission. The guiding circular body 14 is set on the slides 13 by means of a carrying saddle 4 which is movable in the crosswise direction. The shifting of this carrying saddle 4 enables the setting of the guiding circular body 14 towards the worked counter-balanced crankshaft 9 in cross direction, and is carried out adjustably by means of a hand or mechanical feed. The guidings are covered in order to prevent intrusion of impurities by steel belts and folding cover 17. The bed slides 13 also serves for mounting the electric box with electric equipment and a lubricating pump for lubrication of the bed guiding.

The guiding circular body 14 is formed as a carrying element having a "U" profile which is generally annular and is provided in the part adjacent to the counter-balanced crankshaft 9 with an opening 43 of a sufficient width so that the widest part of the worked counter-balanced crankshaft 9 that is the central crank pin or crankshaft journal could be put through into the central space. Within the inner periphery of the guiding circular body 14 defined by a guiding 28 there is seated the rotary carrying body 18 which is also provided in the same place as the guiding circular body 14 with the opening 43, so that both said bodies 14 and 18 coalesce together in basic position and, thus, free input into their inner part is provided. The rotary carrying body 18 moves within the guiding circular body 14 and its drive is provided by means of two driving elements, for example toothed wheels 19, onto the shafts of which there are keyed rigidly two worm wheels 20 which are in gear meshing with the worms 21 driven by a belt drive 22 from a two-speed motor. The rotary carrying body 18 is in its inner part provided with linked bracing in order to ensure the required stiffness. The rotary carrying body is also provided on this inner part, in place against the opening 43, with a machining means, for example with a wheel-head 23 mounted in a special housing and provided with a cup grinding wheel 24, so that the worked crankshaft journal of the counter-balanced crankshaft is machined and grinded frontally. The forward and backward feeding of the grinding wheel 24 is provided by means of two ratchet pawls with a small stroke in order to achieve a fine feeding. The feeding is carried out by hand or automatically. The cylindrical body of the wheel head 23 is provided with a thread into which a matrix is geared, the surface of the matrix being provided with the ratchets 34 and 35 against which there is inclined tooth system 38 and 39. When feeding in one or the other direction takes place pawls 37 controlled by electromagnets 36 are used. The rotary carrying body 18 is also provided with a superfinishing element 25 and superfinishing stones 33. Said superfinishing element 25 is also of a cylindrical shape and within its hollow inner space there is provided an electric motor providing oscillatory movement of the superfinishing stones 33 mounted on a resilient holder. Shifting into gear meshing is carried out by means of a toothed wheel 40. The supply of electric energy for a motor driving the wheel-head 23, superfinishing element 25 and controlling of electromagnets 36 is carried out by means of collecting discs 42. The drive for the rotary carrying body 18 is provided, as it has been said before, by means of the two toothed wheels 19 connected through the worm and belt gear on the electric motor. Said spur gears 19 are in gear meshing with toothed ring 41 which is rigidly fixed along the whole periphery of the rotary carrying body 18. The driving toothed wheels 19 are mutually positioned such that the distance between them is greater than the width of the opening 43 so that at least one of them would be in a driving gear meshing with said toothed ring 41 when passing said opening 43.

The grinding of a counter-balanced crankshaft 9 is carried out on the machine tool according to the invention in such a way that the worked counter-balanced crankshaft 9 is supported by its ends between the clamping boards 6 of the working headstocks 3. It is then set by means of gear of the working headstocks 3 and by means of dividing grooves 32 into correct working position towards the grinded crankshaft journal of the counter-balanced crankshaft 9, as is shown in FIG. 2. The counter-balanced crankshaft 9 is secured in this position by means of the pawls 31 and it is further supported by the shifted and set supporting rests 10 in order to eliminate any deflection. After the particular crankshaft journal is supported and set into the working position for grinding, the bed slides 13 are fed axially as far as the machining tools. That is, the cup grinding wheel 24 and superfinishing stones 33 would be placed at an initial position against the journal. The rotary carrying body 18 is then adjusted into the corresponding position with the guiding circular body 14 so that the both openings 43 are mutually coincidental. The guiding circular body 14 together with such adjusted rotary carrying body 18 are shifted towards the worked journal by means of the carrying saddle 4 and are put over the journal through the coincidental openings 43 transversally. Then, by means of a measuring optical apparatus, there is ensured the coaxiality of axis of the worked journal and axis of the rotary carrying body 18. Thus, the rotary carrying body is set into the working position within the guiding circular body 14. Afterwards the cup grinding wheel 24 is fed on the wheel-head 23 into the grinding position, and the grinding cut is set. The cup grinding wheel 24 is put into operation together with the superfinishing stones 33. Thus, the operating cup grinding wheel is, when grinding, carried by the rotary carrying body 18 round the whole periphery of the ground crankshaft journal which is thus worked at preadjusted parameters with the required precision. The cup grinding wheel works the journal in two paths as the grinding takes place on two small surfaces along the contacting lines with the journal. The superfinishing stones 33 successively superfinish the journal surface and high quality of final working of this surface is provided. By means of the bed slides 13 there is provided, for each revolution of the cup grinding wheel 24 around the journal periphery, the longitudinal shifting such that the grinding paths would overlap each other and the journal would be regularly ground on its entire surface. When the grinding and superfinishing of the journal has been completed the cup grinding wheel 24, together with the superfinishing stones 25 are moved from the journal surface, their movement is then stopped and the rotary carrying body 18 is again set into the equal position with the guiding circular body 14. These are moved together from the ground journal by means of a transverse motion whereby the counter-balanced crankshaft is pivoted by means of the working headstocks 3 into another required working position. It is secured, and the guiding circular body 14 is set in the same way for working another required part of the counter-balanced crankshaft 9.

As a machining element also can be used a common grinding wheel or lathe cutter with another constructional arrangement according to requirements.

What is claimed:

1. A machine tool for heavy counter-balanced crankshafts comprising a rear bed and front bed with two rotatable working headstocks for supporting a worked counter-balanced crankshaft, said working headstocks being located at opposite sides of the rear bed, at least one supporting grinder rest placed between the working headstocks, said front bed being adjacent to the rear bed, longitudinally movable bed slides located on each of said beds, a carrying saddle placed upon said slides, a rotatable guiding circular body mounted on the carrying saddle, a rotary carrying body pivotally mounted within said guiding circular body, said rotary carrying body provided with its own driving means for circular movement within said guiding circular body and being provided, further, on its inner part with an adjustable machining means, said guiding circular body and rotary carrying body are provided with openings positioned on the side to the worked crankshaft, said openings enabling, when coincidently set on both said bodies, to put a working member consisting of guiding circular body and rotary carrying body with working tool on a worked heavy counter-balanced crankshaft.

2. A machine tool according to claim 1, including driving means for said rotary carrying body to ensure the circular working motion within the guiding circular body, said driving means comprising a toothed ring fixed on the outer periphery of the rotary carrying body, a driving gear consisting of at least two driving elements located from each other at the distance greater than the width of the openings so that at least one of those driving elements would be in driving gear with the rotary carrying body when its opening passes across them.

3. A machine tool according to claim 1, including adjustable machining means arranged as a segment carrying a cup grinding wheel and a successive superfinishing member mounted on a wheel-head rigidly placed within the rotary carrying body and enabling cross-directional movement of said machining means.

* * * * *